No. 639,583. Patented Dec. 19, 1899.
W. S. KEENE.
FILTERING TUNNEL.
(Application filed Apr. 19, 1899.)

(No Model.)

Witnesses.
Lauritz N. Möller.
Margaret C. Waby.

Inventor.
Walter S. Keene.
by Alban Andrieu
his atty.

UNITED STATES PATENT OFFICE.

WALTER S. KEENE, OF LEWISTON, MAINE, ASSIGNOR OF ONE-HALF TO JOEL BEAN, JR., OF SAME PLACE.

FILTERING-TUNNEL.

SPECIFICATION forming part of Letters Patent No. 639,583, dated December 19, 1899.

Application filed April 19, 1899. Serial No. 713,543. (No model.)

*To all whom it may concern:*

Be it known that I, WALTER S. KEENE, a citizen of the United States, residing at Lewiston, in the county of Androscoggin and State of Maine, have invented new and useful Improvements in Filtering-Tunnels, of which the following is a specification.

This invention relates to filtering devices, and has for its object to provide a novel, simple, efficient, economical, and conveniently-portable oil-filtering tunnel particularly designed for filling lamps and filtering the oil as it flows through the tunnel to the filling-orifice of the lamp-fount. This object is accomplished in the manner and by the means hereinafter described and claimed, reference being made to the accompanying drawings, in which—

Figure 1:
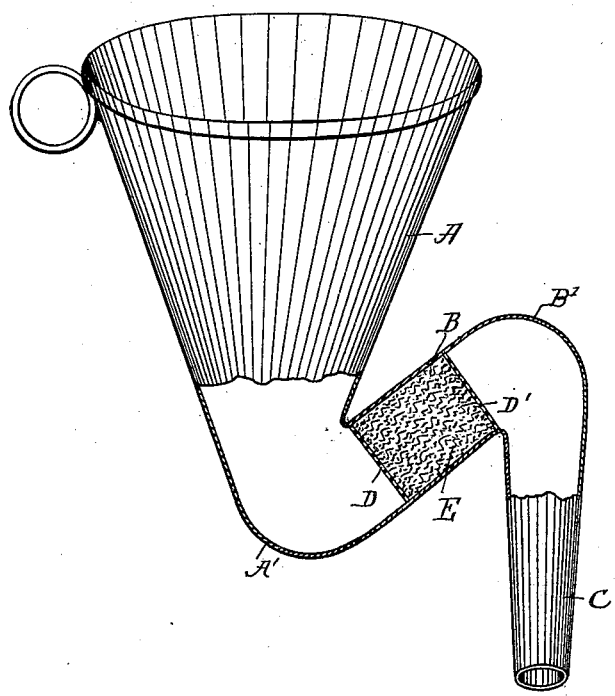
Figure 2:
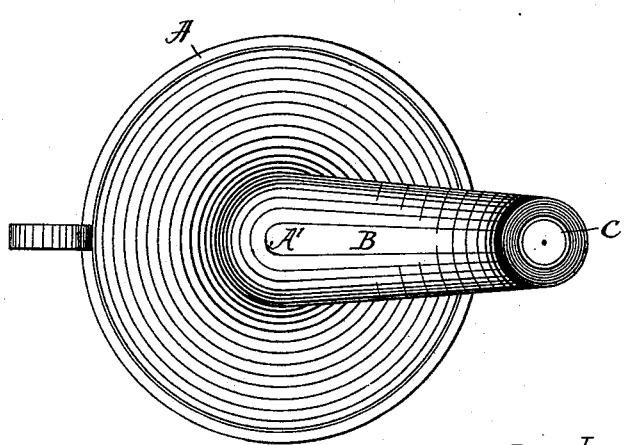

Figure 1 is a sectional elevation of an oil-filtering tunnel constructed in accordance with my invention, and Fig. 2 is a bottom plan view of the same.

In order to enable others to make and use my invention, I will now describe the same in detail, referring to the drawings, wherein—

The letter A indicates a hollow conoidal-shaped or tapering body formed at its lower and smallest end with an elbow A' and having its upper and largest end in the form of an enlarged open mouth, into which the oil from an oil-can or other receptacle can be conveniently poured or introduced. The elbow A' is extended into an upwardly-inclined tube B, having an elbow B' at its upper end, which is located considerably below the wide open mouth of the body A and is extended vertically downward into a gradually-tapering delivery nozzle or tube C, adapted to enter the filling-orifice of a lamp-fount to deliver the oil thereinto. The upwardly-extending inclined tube B contains the filter, which is composed of a filtering medium E, confined between two separated, foraminous, or perforated disks or plates D D', secured inside tube B between the elbow A' and B'.

The conoidal or tapering body, the elbows, and the tubes are composed of sheet metal or any other material suitable for the purpose, and these parts, as herein shown, are made an integral structure.

The oil poured into the wide open mouth of the hollow, conoidal, or tapering body may accumulate therein and descend to the elbow A', and then it is compelled to rise under pressure and against the force of gravity through the filter in the upwardly-extending inclined tube B to the elbow B', from which the filtered oil descends through the gradually-tapering nozzle or tube C into the filling-orifice of the lamp. The filter arrests the impurities contained in the oil, and they are returned to the elbow A'.

Obviously the filtering-tunnel can be used for other purposes than filling lamps with oil.

The device is of such construction that it can be conveniently and quickly cleaned, and it may be used a considerable length of time before becoming foul or clogged up. By arranging the elbow B' considerably below the wide open mouth or upper end of the hollow conoidal body A the oil accumulating therein will naturally and in seeking its level rise through the filter without other force or pressure being applied for that purpose.

Having thus described my invention, what I claim is—

1. An oil-filtering tunnel, consisting of the hollow conoidal or tapering body having an elbow at its lower and smallest end, an inclined tube extending upward from said elbow, an elbow arranged on the upper end of said inclined tube, below the upper end of said body and extended downward into a delivery nozzle or tube constructed to enter the filling-orifice of a lamp, and a filter arranged wholly within the inclined tube between said elbows, substantially as described.

2. An oil-filtering tunnel, consisting of the hollow body having a wide open mouth at its upper end and an elbow at its lower end, an inclined tube extending upwardly from said elbow, an elbow arranged on the upper end of the inclined tube below the open mouth of said body and extended downward into a tapering delivery nozzle or tube to enter the filling-orifice of a lamp-fount, the two separated foraminous disks secured within the inclined tube at points between said elbows, and a filtering medium confined between the foraminous disks, substantially as described.

In testimony whereof I have hereunto set my hand in presence of two subscribing witnesses.

WALTER S. KEENE.

Witnesses:
HERBERT MCCANN,
M. A. WHITE.